_(12)_ United States Patent
Suryanarayana et al.

(10) Patent No.: US 11,829,772 B2
(45) Date of Patent: Nov. 28, 2023

(54) HETEROGENEOUS COMPUTE DOMAINS WITH AN EMBEDDED OPERATING SYSTEM IN AN INFORMATION HANDLING SYSTEM

(71) Applicant: Dell Products L.P., Round Rock, TX (US)

(72) Inventors: Shekar Babu Suryanarayana, Bangalore (IN); Sumanth Vidyadhara, Bangalore (IN); Vivek Viswanathan Iyer, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 74 days.

(21) Appl. No.: 17/716,632

(22) Filed: Apr. 8, 2022

(65) Prior Publication Data

US 2023/0325201 A1    Oct. 12, 2023

(51) Int. Cl.
*G06F 9/00*      (2006.01)
*G06F 9/4401*    (2018.01)
*G06F 9/54*      (2006.01)

(52) U.S. Cl.
CPC ............ *G06F 9/4408* (2013.01); *G06F 9/544* (2013.01)

(58) Field of Classification Search
CPC .............................. G06F 9/4408; G06F 9/544
See application file for complete search history.

(56) References Cited

U.S. PATENT DOCUMENTS

| | | | |
|---|---|---|---|
| 10,929,149 B2* | 2/2021 | Jones | G06F 8/654 |
| 2020/0042710 A1 | 2/2020 | Liu et al. | |
| 2020/0310774 A1 | 10/2020 | Zhu et al. | |
| 2023/0008874 A1* | 1/2023 | Stabrawa | G06F 9/45558 |

* cited by examiner

*Primary Examiner* — Nitin C Patel
(74) *Attorney, Agent, or Firm* — Larson Newman, LLP

(57) ABSTRACT

An information handling system includes a memory device, a memory, a chipset, and a basic input/output system (BIOS). The chipset includes a main processor and a hybrid processor. During a first pre-boot phase, the BIOS memory maps the hybrid processor to a first portion of the memory device, and stores an embedded operating system in the memory. During a second pre-boot phase, the BIOS memory maps the main processor to a second portion of the memory device, stores a host operating system in the memory, and loads the embedded operating system on the hybrid processor. The second portion is a larger portion of the memory device than the first portion.

16 Claims, 10 Drawing Sheets

HETEROGENEOUS COMPUTE DOMAINS WITH AN EMBEDDED OPERATING SYSTEM IN AN INFORMATION HANDLING SYSTEM

FIELD OF THE DISCLOSURE

The present disclosure generally relates to information handling systems, and more particularly relates to heterogeneous compute domains with an embedded operating system in an information handling system.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a chipset having a main processor and a hybrid processor. During a first pre-boot phase, the BIOS may memory map the hybrid processor to a first portion of a memory device, and store an embedded operating system in a memory. During a second pre-boot phase, a BIOS may memory map the main processor to a second portion of the memory device, store a host operating system in the memory, and load the embedded operating system on the hybrid processor. The second portion may be a larger portion of the memory device than the first portion.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
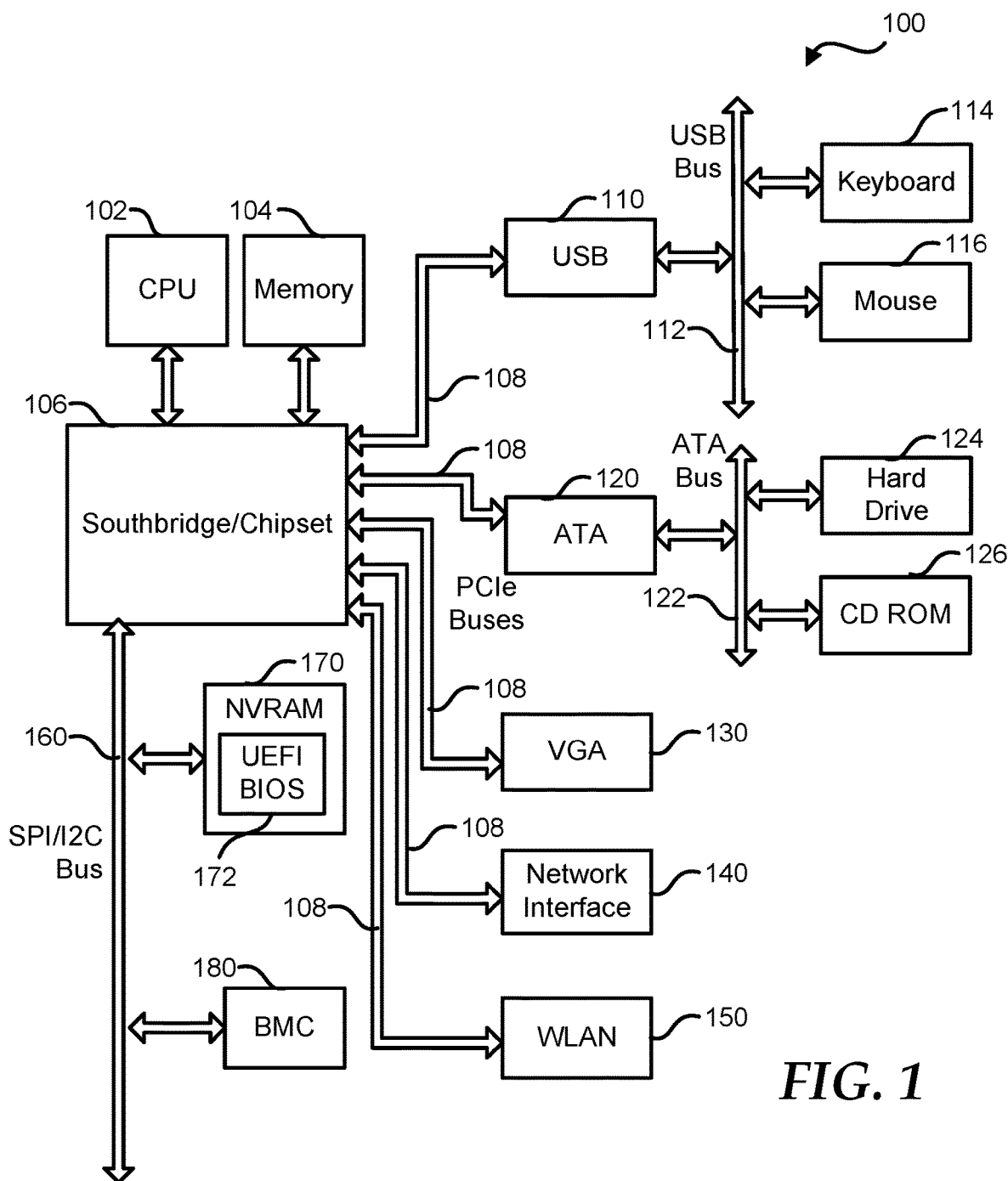
FIG. 1 is a block diagram of an information handling system according to an embodiment of the present disclosure.

FIG. 1 illustrates an information handling system 100 according to at least one embodiment of the disclosure. For purpose of this disclosure information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch, a router, or another network communication device, or any other suitable device and may vary in size, shape, performance, functionality, and price.

Information handling system 100 includes a processor 102, a memory 104, a chipset 106, a PCI bus 108, a universal serial bus (USB) controller 110, a USB 112, a keyboard device controller 114, a mouse device controller 116, a configuration database 118, an ATA bus controller 120, an ATA bus 122, a hard drive device controller 124, a compact disk read only memory (CD ROM) device controller 126, a video graphics array (VGA) device controller 130, a network interface controller (MC) 140, a wireless local area network (WLAN) controller 150, a serial peripheral interface (SPI) bus 160, a flash memory device 170 for storing UEFI BIOS code 172, a trusted platform module (TPM) 180, and a baseboard management controller (EC) 190. EC 190 can be referred to as a service processor, and embedded controller, and the like. Flash memory device 170 can be referred to as a SPI flash device, BIOS non-volatile random access memory (NVRAM), and the like. EC 190 is configured to provide out-of-band access to devices at information handling system 100. As used herein, out-of-band access herein refers to operations performed without support of CPU 102, such as prior to execution of UEFI BIOS code 172 by processor 102 to initialize operation of system 100. In an embodiment, system 100 can further include a platform security processor (PSP) 174 and/or a management engine (ME) 176. In particular, an x86 processor provided by AMD can include PSP 174, while ME 176 is typically associated with systems based on Intel x86 processors.

PSP 174 and ME 176 are processors that can operate independently of core processors at CPU 102, and that can execute firmware prior to the execution of the BIOS by a primary CPU core processor. PSP 174, included in recent AMD-based systems, is a microcontroller that includes dedicated read-only memory (ROM) and static random access memory (SRAM). PSP 174 is an isolated processor that runs independently from the main CPU processor cores. PSP 174 has access to firmware stored at flash memory device 170. During the earliest stages of initialization of system 100, PSP 174 is configured to authenticate the first block of BIOS code stored at flash memory device 170 before releasing the x86 processor from reset. Accordingly, PSP 174 provides a hardware root of trust for system 100. ME 176 provides similar functionality in Intel-based systems. In another embodiment, EC 190 can provide aspects of a hardware root of trust. The root of trust relates to software processes and/or hardware devices that ensure that firmware and other software necessary for operation of an information handling system is operating as expected.

Information handling system 100 can include additional components and additional busses, not shown for clarity. For example, system 100 can include multiple processor cores, audio devices, and the like. While a particular arrangement of bus technologies and interconnections is illustrated for the purpose of example, one of skill will appreciate that the techniques disclosed herein are applicable to other system architectures. System 100 can include multiple CPUs and redundant bus controllers. One ore more components can be integrated together. For example, portions of chipset 106 can be integrated within CPU 102. In an embodiment, chipset 106 can include a platform controller hub (PCH). System 100 can include additional buses and bus protocols, for example I2C and the like. Additional components of information handling system 100 can include one or more storage devices that can store machine-executable code, one or more communications ports for communicating with external devices, and various input and output (I/O) devices, such as a keyboard, a mouse, and a video display.

For purposes of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as CPU 102, a programmable logic array (PLA), an embedded device such as a System-on-a-Chip (SoC), or other control logic hardware. Information handling system 100 can also include one or more computer-readable medium for storing machine-executable code, such as software or data.

Unified Extensible Firmware Interface (UEFI) BIOS code 172 can be referred to as a firmware image, and the term BIOS is herein used interchangeably with the term firmware image, or simply firmware. In an embodiment, UEFI BIOS 172 can be substantially compliant with one or more revisions of the UEFI specification. As used herein, the term Extensible Firmware Interface (EFI) is used synonymously with the term UEFI. The UEFI standard replaces the antiquated personal computer BIOS system found in some older information handling systems. However, the term BIOS is often still used to refer to the system firmware. The UEFI specification provides standard interfaces and interoperability guidelines for devices that together make up an information handling system. In particular, the UEFI specification provides a standardized architecture and data structures to manage initialization and configuration of devices, booting of platform resources, and passing of control to the OS. The UEFI specification allows for the extension of platform firmware by loading UEFI driver and UEFI application images. For example, an original equipment manufacturer can include customized or proprietary images to provide enhanced control and management of the information handling system 100. While the techniques disclosed herein are described in the context of a UEFI compliant system, one of skill will appreciate that aspects of the disclosed systems and methods can be implemented at substantially any information handling system having configurable firmware.

UEFI BIOS code 172 includes instructions executable by CPU 102 to initialize and test the hardware components of system 100, and to load a boot loader or an operating system (OS) from a mass storage device. UEFI BIOS code 172 additionally provides an abstraction layer for the hardware, i.e. a consistent way for application programs and operating systems to interact with the keyboard, display, and other input/output devices. When power is first applied to information handling system 100, the system begins a sequence of initialization procedures. During the initialization sequence, also referred to as a boot sequence, components of system 100 are configured and enabled for operation, and device drivers can be installed. Device drivers provide an interface through which other components of the system 100 can communicate with a corresponding device.

The storage capacity of SPI flash device 170 is typically limited to 32 MB or 64 MB of data. However, original equipment manufacturers (OEMs) of information handling systems may desire to provide advanced firmware capabilities, resulting in a BIOS image that is too large to fit in SPI flash device 170. Information handling system can include other non-volatile flash memory devices, in addition to SPI flash device 170. For example, memory 104 can include non-volatile memory devices in addition to dynamic random access memory devices. Such memory is referred to herein as non-volatile dual in-line memory module (NVDIMM) devices. In addition, hard drive 124 can include non-volatile storage elements, referred to as a solid state drive (SSD). For still another example, information handling system 100 can include one or more non-volatile memory express (NVMe) devices. Techniques disclosed herein provide for storing a portion of a BIOS image at one or more non-volatile memory devices in addition to SPI flash device 170.

Figure 2:
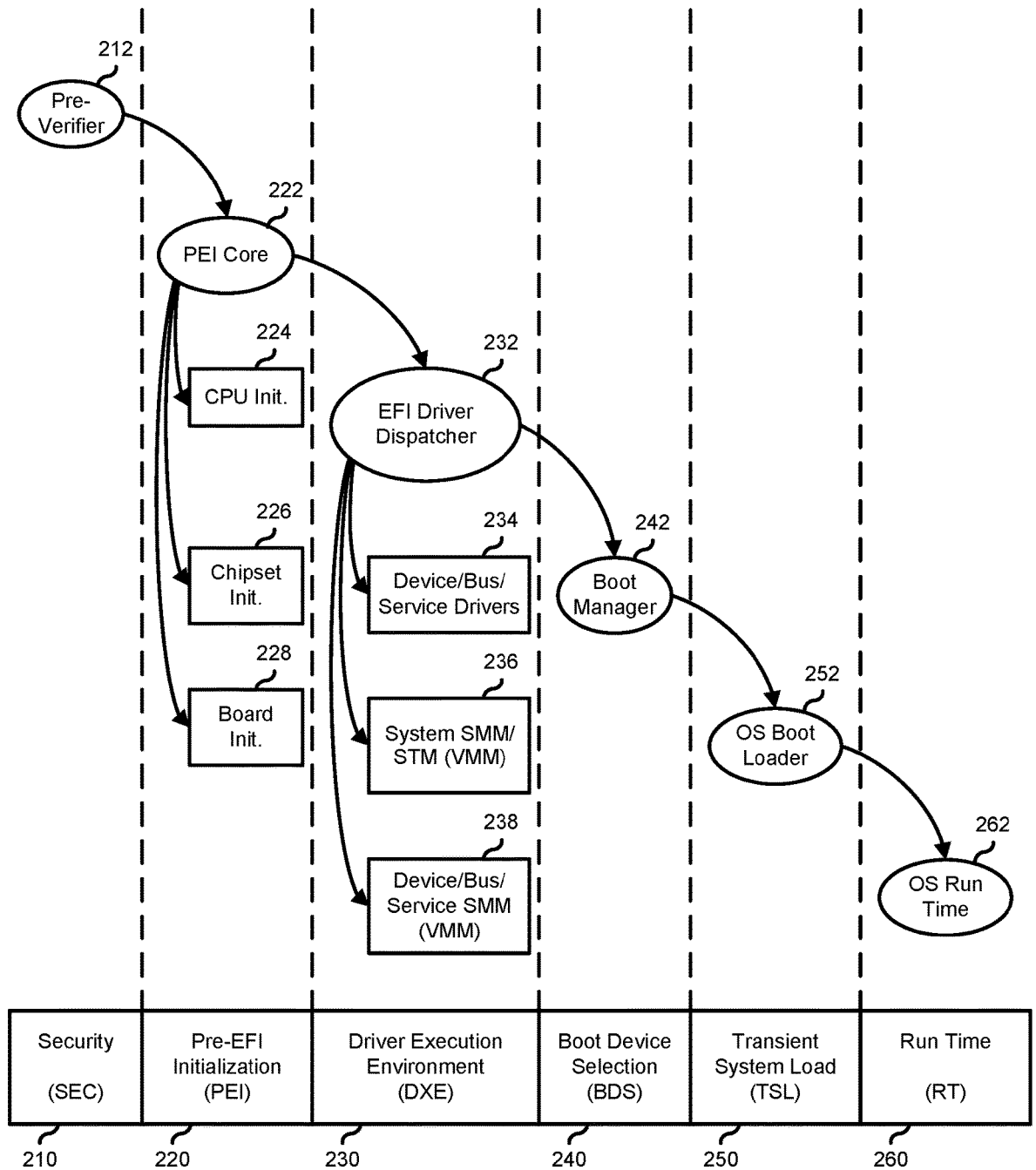
FIG. 2 is a phase diagram for the boot of an information handling system that operates using a Unified Extensible Firmware Interface (UEFI) according to another embodiment of the present disclosure.

FIG. 2 illustrates a phase diagram 200 for the boot of an information handling system that operates using a UEFI, including a security (SEC) phase 210, a pre-EFI initialization (PEI) phase 220, a driver execution environment (DXE) phase 230, a boot device selection (BDS) phase 240, a transient system load (TSL) phase 250, and a run time (RT) phase 260. SEC 210 is the first phase of a UEFI boot process on the information handling system that operates to set up a pre-verifier 212 that handles all restart events on the information handling system, and temporarily allocates a portion of memory for use during the other boot phases. Pre-verifier 212 is executed out of the firmware resident on the information handling system, and so serves as a root of trust for the system. Pre-verifier 212 passes execution to PEI 220 that executes a PEI core 222 to initialize the system memory for the information handling system. PEI core 222 includes CPU initialization 224, chipset initialization 226, and board resource initialization 228. PEI core 222 passes execution to DXE 230 that executes an EFI driver dispatcher 232 to perform device specific initializations for the information handling system, including loading device, bus, and service drivers 234, and instantiating a system SMI handler 236. EFI driver dispatcher 232 passes execution to BDS 240 that executes a boot manager 242 that identifies a boot target, and passes execution to TSL 250. TSL 250 launches an OS boot loader 252 that loads the operating system, and passes execution to the operating system at RT 260.

BIOS/UEFI code is typically stored in a Serial Peripheral Interface (SPI) read-only memory (ROM) of an information handling system. SPI ROM devices have the benefit that the data stored thereon is non-volatile, and so the data is retained when the information handling system is powered off. However, the SPI interface is typically very slow, and the capacities available for SPI ROM are typically small when compared with other volatile memory devices, such as Dynamic Random Access Memory (DRAM) Dual In-Line Memory Modules (DIMMs) or Non-Volatile Memory-Express (NVMe) SSDs. For example, a typically available SPI ROM my have a capacity of 16-32 megabytes (MB), while DIMMs and NVMe SSDs typically have capacities measured in gigabytes (GB). As such, SPI ROM devices are typically selected based upon a tradeoff between the device cost and the size of the computer firmware needed to operate the information handling system. Further, once an information handling system has been designed and produced, the size of the SPI ROM is fixed and not upgradable because the SPI ROM devices are typically mounted directly to a motherboard of the information handling system.

For this reason, the BIOS/UEFI code image size is carefully managed to fit within the size restriction imposed by the SPI ROM device in the information handling system. Thus, while increased BIOS/UEFI code functionality may be desirable, it is often difficult to justify increases in the size of the SPI ROM to accommodate the increased functionality. Some features that are typically not included in a BIOS/UEFI code image due to size constraints imposed by the SPI ROM size may include diagnostic UEFI applications which may consume upwards of one MB, a BIOS/UEFI based network stack driver which may consume upwards of one MB, a BIOS/UEFI support application for remote support and recovery services which may consume upwards of four MB, custom logo and BIOS/UEFI splash screen data which may consume upwards of one MB, or other utilities or functions, as needed or desired.

Moreover, due to the size limitation of the SPI ROM in an information handling system, the SPI ROM is typically populated only with a primary copy of the BIOS/UEFI code. In particular, this means that a recovery image of the BIOS/UEFI code is not resident on the SPI ROM in case the primary BIOS/UEFI code image becomes corrupted, and elaborate procedures are typically needed to recover from a corrupted BIOS/UEFI code image or to update to a new version of the BIOS/UEFI code image. For example, a Capsule Update is a well-established method to update BIOS/UEFI code components within an information handling system. Capsule Update allows for signed BIOS/UEFI code images to be stored in a portion of the system memory to be flashed to the SPI ROM during a warm reboot, assuming the integrity of the system memory is preserved during the warm re-boot. If there is any disruption of the system memory block that stores the new BIOS/UEFI code image before the image is flashed to the SPI ROM, the operation will fail.

FIGS. 3-6 illustrate a portion of an information handling system 300 during different pre-boot phases according to another embodiment of the present disclosure. Information handling system 300 may be substantially similar to information handling system 100 and may include any components of information handling system 100 without varying from the scope of this disclosure. Information handling system 300 includes a main processor core 302, a hybrid processor core 304, a level 3 (L3) cache 306, and dual in-line memory module devices 308 and 310. Main processor core 302 may include any suitable number of sub-cores, such as cores 320, 322, 324, and 326. Hybrid processor 304 may include any suitable number of sub-cores, such as cores 330, 332, 334, and 336. In an example, main processor core 302 and hybrid processor core 304 may be two cores within a single processor. In certain examples, main processor core 302 may be a large core with a large amount of resources of information handling system 300 assigned to the main processor core, and hybrid processor 304 may be a small core with a smaller amount of the resources assigned to the hybrid processor. Information handling system 300 may include additional components without varying from the scope of this disclosure.

In an example, information handling system 300 may support out-of-band management (OOBM) to provide remote management capabilities to an information technology (IT) administrator to reduce unplanned downtime of the information handling system. In previous information handling systems, an out-of-band experience (OOBE) is not available to provide an efficient first connection experience for updates and deployment of the updates. While previous information handling systems may include main processing cores and auxiliary hybrid processors, these information handling systems do not include a firmware architecture to support partition of the compute cores to provide a heterogeneousgeneous compute domain for an OOBE at OS runtime of the information handling system. In previous information handling systems, the CPU may utilize the CPU cycles to provide interoperability between other information handling systems, docks, and other components in communication with the information handling system. However, the utilization of the CPU cycles for these operations may reduce performance of OS, VM, and container space workloads. Additionally, previous information handling systems do not have an OS independent OOBE to execute an ITDM tool to manage workspace security updates.

Information handling system 300 may be improve by UEFI/BIOS pre-boot operations creating a heterogeneous-geneous compute domain including, but not limited to, a host OS and an embedded OS to run parallel and independently from one another. In this example, the pre-boot operations may securely partition hardware resources of information handling system 300 to create the two impendent compute domains, such as main processor core 302 and hybrid processor core 304, and each compute domain may run its own dedicated OS. Information handling system 300 may be further improved by creating a SMI interrupting mechanism to enable inter processor communication between main processor core 302 and hybrid processor core 304. In an example, a BIOS, such as BIOS 172 of FIG. 1, may perform the operations described herein for each of the pre-boot phases of information handling system 300.

Figure 3:
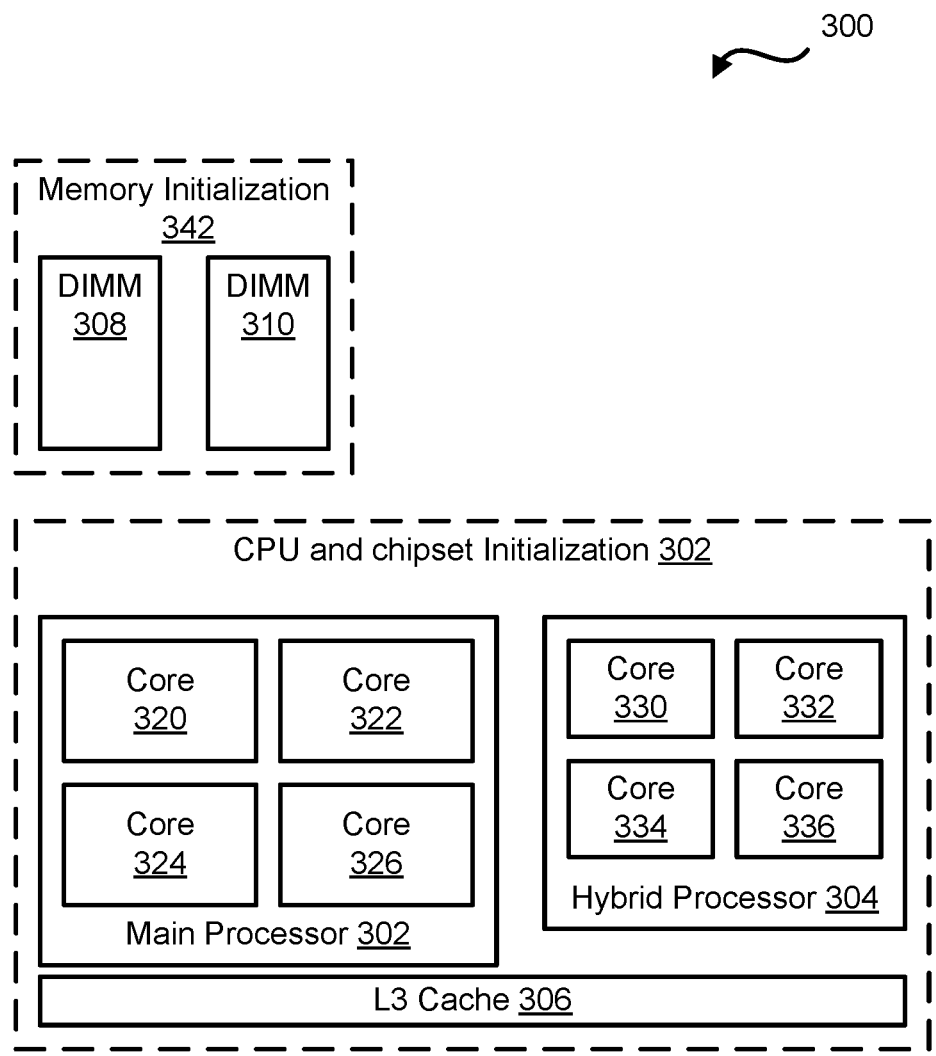
FIG. 3 is block diagram of different components in an information handling system during a first pre-boot phase according to another embodiment of the present disclosure.

Referring now to FIG. 3, during the first pre-boot phase, such as PEI phase, one or more suitable operations may be performed to begin the pre-boot of information handling system 300. For example, during the PEI phase a hand-off-block (HOB) may be created to handle the driver initialization in DXE phase. In an example, the driver initialization may be separate for main processor 302 and hybrid processor 304. After creation of the HBO, it may be passed to DXE phase to trigger a dual dispatcher to separately load drivers for main processor 302 and hybrid processor 304.

In an example, a CPU and chipset initialization 340 may be performed for main processor 302, hybrid processor 304, and L3 cache 306. In this example, the BIOS may execute any suitable number of operations to perform CPU and chipset initialization 340. For example, the BIOS may initialize each core 320-326 of main processor 302, each core 330-336 of hybrid processor 304, and L3 cache 306. During the PEI phase, the BIOS may perform a memory initialization 342. In an example, the BIOS may execute any suitable code to perform memory initialization 342, which may initialize DIMM devices 308 and 310 for use by main processor 302 and hybrid processor 304 as will be allocated in a subsequent pre-boot phase. In response to the completion of CPU and chipset initialization 340 and memory initialization 342, the BIOS may pass execution to a DXE phase, which in turn may execute an EFI driver dispatcher to perform device specific initializations for information handling system 300, including loading device, bus, and service drivers, and instantiating a system SMI handler as will be described with respect to FIG. 4.

Figure 4:
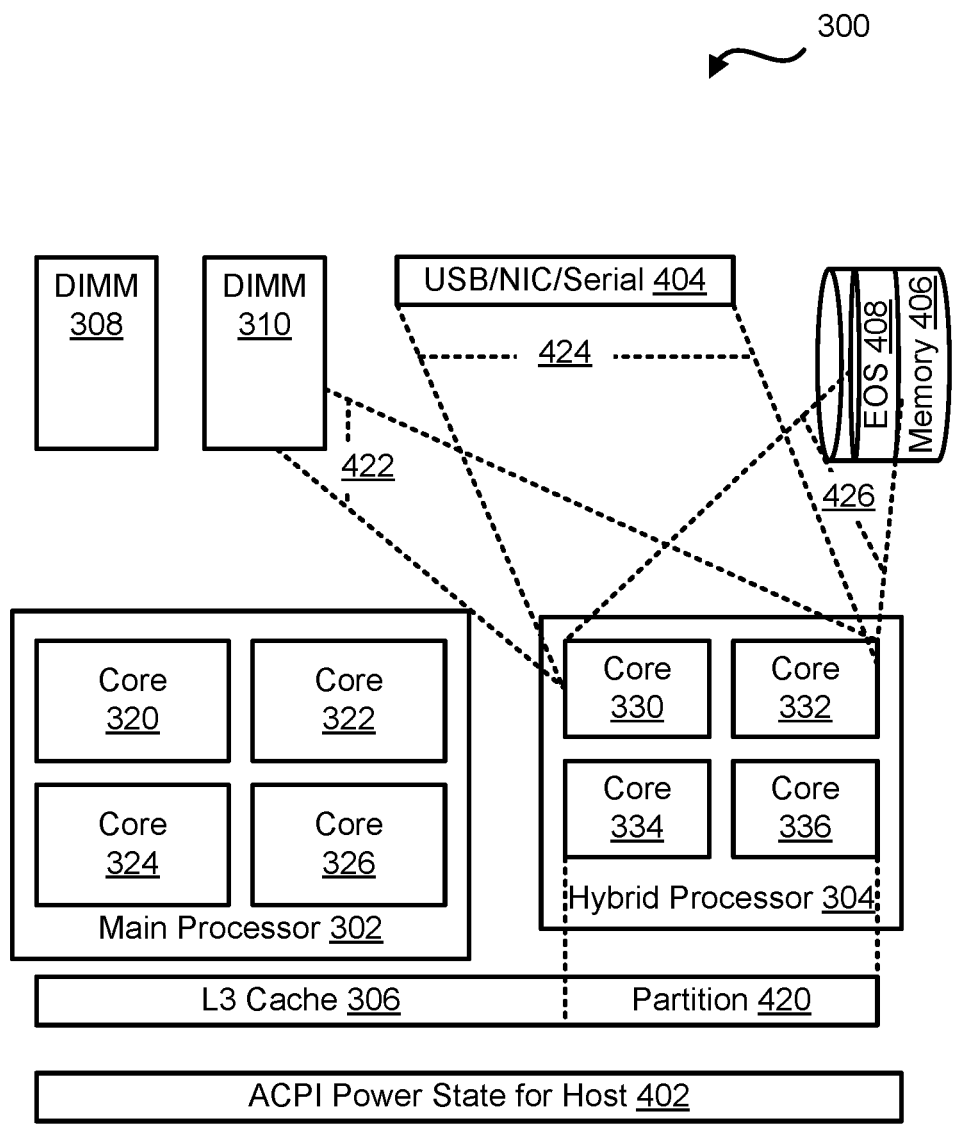
FIG. 4 is block diagram of the different components in the information handling system during a second pre-boot phase according to another embodiment of the present disclosure.

Referring now to FIG. 4, during a post PEI phase, such as in the early DXE phase, the BIOS may create an advanced configuration and power interface (ACPI) power state 402 for the host processor of information handling system 300. For example, the ACPI power state 402 may be assigned to main processor 302. Information handling system 300 further includes a shared memory 404, such as peripherals like USB, NIC, Serial, and a memory 406. Memory 406 may be utilized to store boot data for an embedded operating system (EOS) 408.

During the early DXE phase, the BIOS may reinitialize main processor 302, hybrid processor 304, L3 cache 306, and DIMM devices 308 and 310 to create a partition and a dedicated memory map for hybrid processor 304. For example, the BIOS may create a dedicated partition 420 in L3 cache 306 for hybrid processor 304. Dedicated partition 420 within L3 cache 306 may be utilized by hybrid processor 304, while other portions of the L3 cache may be utilized by main processor 302.

In an example, the BIOS may perform a memory mapping 422 to map a dedicated portion of DIMM device 308 or 310 to hybrid processor 304. Memory mapping 422 of hybrid processor 304 to DIMM device 308 or 310 may allocate a small portion of a DIMM device to the hybrid processor. In certain examples, the BIOS may execute a shared memory mapping 424 to shared memory 404. For example, shared memory mapping 424 may enable hybrid processor 304 to access any and all portions of shared memory 404. During the DXE phase, the BIOS may allocate or memory map 426 a portion of memory 406 to hybrid processor 304. Memory mapping 426 of hybrid processor 304 to a portion of memory 406 may enable EOS 408 to be stored in the memory. In certain examples, during the DXE phase, the BIOS may start loading EOS 408 on hybrid processor 304, and not during the BDS phase as in previous information handling systems. In an example, memory mapping of partition 420 in L3 cache 306 as well as memory mappings 422, 424, and 426 may enable the respective L3 cache, DIMM 308 or 310, shared memory 404, and memory 406 to be allocated to hybrid processor 304 at the firmware level.

In the late DXE phase and based on the HOB list created during the PEI phase, the BIOS may utilize the dual dispatcher to load the respective and separate drivers on main processor 302 and hybrid processor 304. In an example, drivers for main processor 302 may be dispatched and loaded in a regular manner to prepare the BDS phase to load the host OS as will be described below with respect to FIG. 5. The BIOS may load the drivers for hybrid processor 304 to prepare a stack to start, locate, and load the RTOS/EOS 408. As stated above, EOS 408 may be loaded in the late DXE phase and prior to the BDS phase. In certain examples, an embedded controller (EC) of information handling system 300 may continue to communicate with the host processor, such as main processor 302, in a manner know in the art, while EOS 408 may prepare an EC communication at late DXE phase to continue any management operations via hybrid processor 304. In response to the BIOS performing the operations described above with respect to FIG. 4, may pass execution to a BDS phase as illustrated in FIG. 5.

Figure 5:
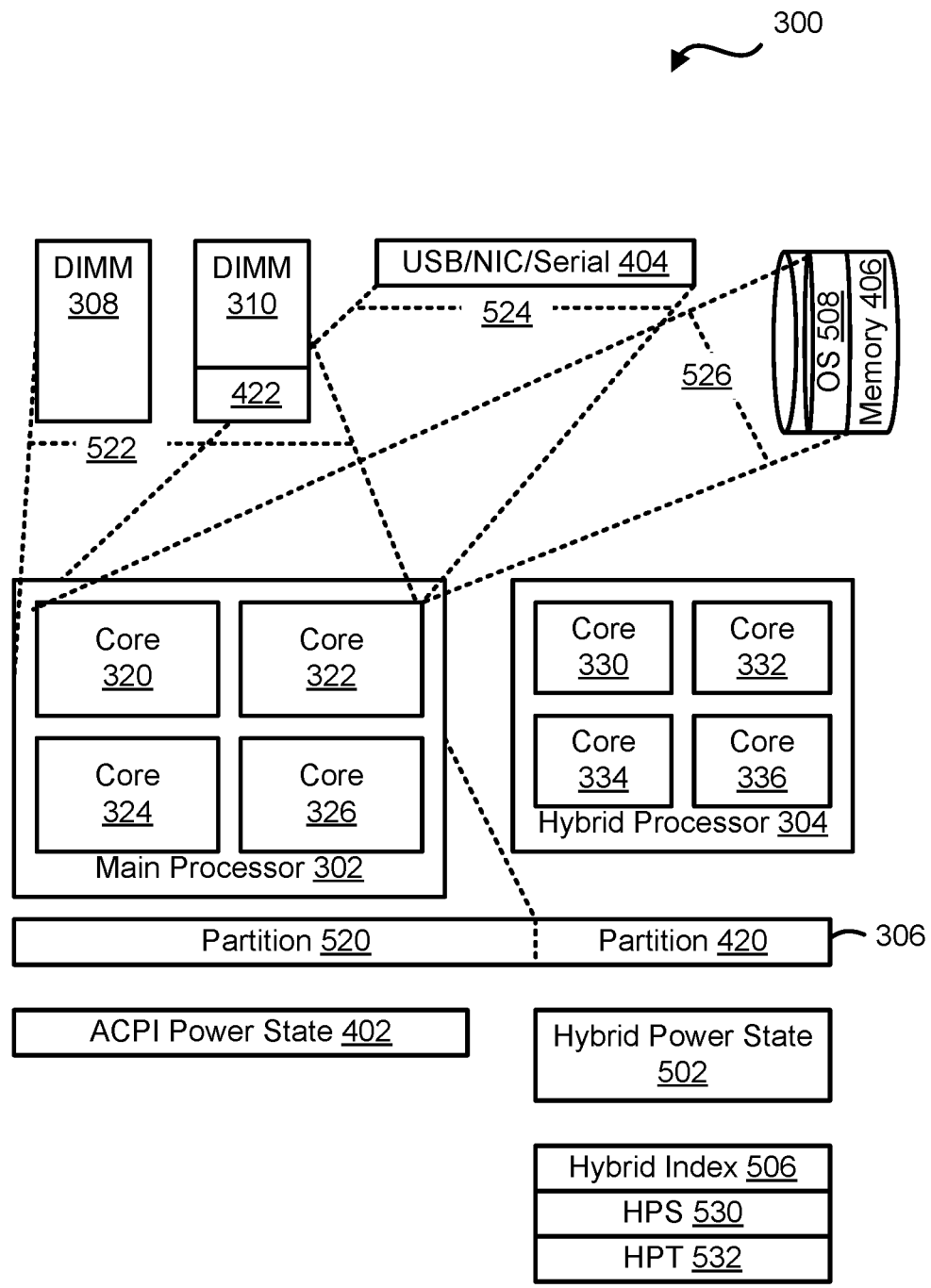
FIG. 5 is block diagram of the different components in the information handling system during a third pre-boot phase according to another embodiment of the present disclosure.

Referring now to FIG. 5, during the BDS phase, the BIOS may create a hybrid power state 502 that is separate from ACPI power state 402. For example, hybrid power state 502 may continue to provide power to hybrid processor 304 even if ACPI power state 402 is unable to provide power to main processor 302. In an example, hybrid power state 502 may be created in any suitable manner including, but not limited to, the BIOS creating a hybrid index table 506. In certain examples, the hybrid index table 506 may include a service entry 510 and a hybrid thermal table 512 associated with hybrid power state 502. In certain examples, hybrid power state 502 may be a low power as compared to ACPI power state 402 allocated to main processor 302.

During the BDS phase, the BIOS may load a host OS 508 in memory 406. In response to the host OS 508 being loaded, the BIOS may start booting the host OS while EOS 408 may be already running from the DXE phase as described above. The BIOS may map a dedicated partition 520 of L3 cache 306 to main processor 302. For example, dedicated partition 520 in L3 cache 306 may be the remaining portion of L3 cache not allocated to hybrid processor 304. In an example, dedicated partition 520 mapped to main processor 302 may be larger than partition 420 mapped to hybrid partition 304. Dedicated partition 520 within L3 cache 306 may be utilized by main processor 302.

In an example, the BIOS may perform a memory mapping 522 to map a dedicated portion of DIMM devices 308 and 310 to main processor 302. Memory mapping 522 of main processor 302 to DIMM devices 308 and 310 may allocate main processor 302 to the all portions of the DIMM devices other than the partition, such as partition 422, allocated to hybrid processor 304. In certain examples, the BIOS may execute a shared memory mapping 524 of shared memory 404. For example, shared memory mapping 524 may enable main processor 302 to access all portions of shared memory 404. In this example, shared memory 404 may be map/allocated to bot main processor 302 and hybrid processor 304. During the BDS phase, the BIOS may allocate or memory map 526 a portion of memory 406 to main processor 302. Memory mapping 526 of main processor 302 to a portion of memory 406 may enable OS 508 to be stored in the memory. In certain examples, during the BDS phase, the BIOS may start loading OS 508 on main processor 302. In an example, memory mapping of partition 520 in L3 cache 306 as well as memory mappings 522, 524, and 526 may enable the respective L3 cache, DIMMs 308 and 310, shared memory 404, and memory 406 to be allocated to main processor 302 at the firmware level. In an example, when the boot services of information handling system 300 are complete, the boot service may exit to a runtime operation as illustrated in FIG. 6.

Figure 6:
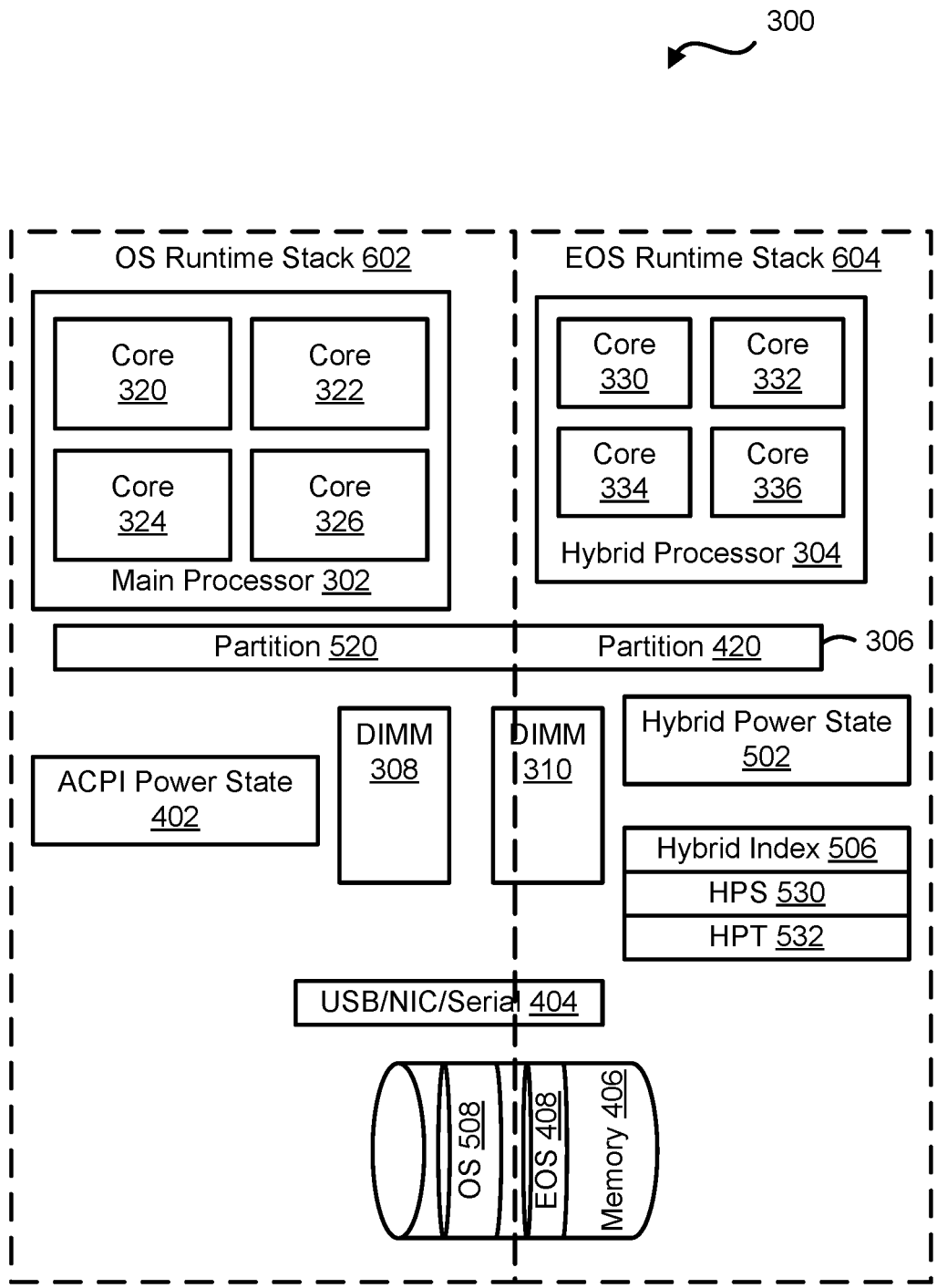
FIG. 6 is block diagram of the different components in the information handling system during runtime according to another embodiment of the present disclosure.

Referring now to FIG. 6, during the runtime, a protocol may be executed to ensure that two independent runtime stacks are created, such as runtime stack 602 for OS 508 and runtime stack 604 for EOS 408. In an example, the protocol to create the independent runtime stacks may be any suitable protocol, such as a heterogeneousgeneous compute domain protocol. In certain examples, a communication may be created between EOS 408 and an EC of information handling system 300 to enable out-of-band (OOB) operations to be performed for the information handling system.

While EOS 408 and host OS 508 each have a respective dedicated runtime stack 602 and 604, the EOS may utilize a smaller memory map to create a heterogeneous compute domain. As shown in FIG. 6, the resources of information handling system 300 allocated to main processor 302 may be located in or assigned to host OS runtime stack 602, and the resources allocated to hybrid processor 304 may be located in or assigned to EOS runtime stack 604. In an example, OS runtime stack 602 includes ACPI power state 402 and EOS runtime stack 604 includes hybrid power state 502. As stated above, ACPI power state 402 is separate from hybrid power state 502, such that hybrid processor 304 may continue to run in a standby or low power state even if OS runtime stack 602 fails, is not running, hung, or is down for any reason. Similarly, ACPI power state 402 being separate from hybrid power state 502 may enable main processor 302 to continue to run even if EOS runtime stack 604 fails, is not running, hung, or is down for any reason. In certain examples, EOS 408 may run any number of features of information handling system 300. For example, EOS 304 may execute serviceability features, and the EOS may provide a platform to run all firmware as a service functionality.

In an example, the partitions of the heterogeneous compute domain may be formed in a manner that EOS 408 may start running only in response to an interrupt, such as a SMI. Additionally, a task may be transferred between OS 508 of main processor 302 and EOS 408 of hybrid processor 304 via an SMI. In an example, the use of SMIs to start EOS 408 and to transfer tasks between OS 508 of main processor 302 and EOS 408 of hybrid processor 304 may improve security within information handling system 300. In certain examples, SMIs may also be utilized to wake main processor 302 from a low power state. Communication between OS 508 of main processor 302 and EOS 408 of hybrid processor 304 via SMIs will be described with respect to FIG. 7.

Figure 7:
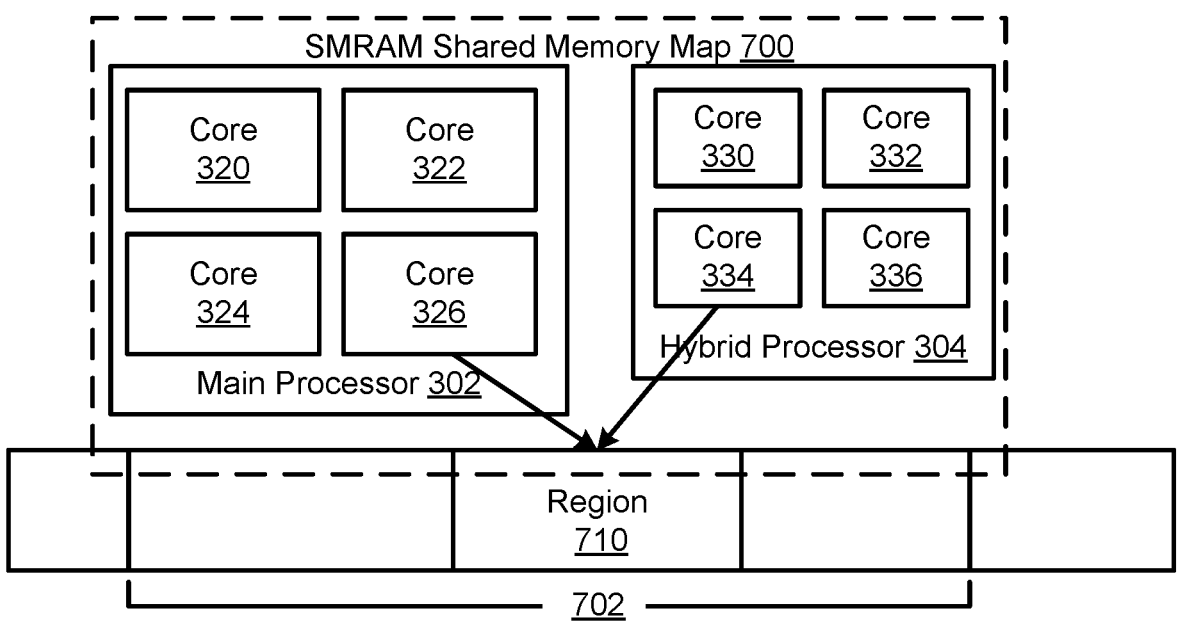
FIG. 7 is block diagram of a main processor and a hybrid processor in the information handling system in a system management interrupt setup according to another embodiment of the present disclosure.

FIG. 7 illustrates a shared memory map 700 of main processor 302 and hybrid processor 304 of information handling system 300 according to another embodiment of the present disclosure. In an example, shared memory map 700 may be associated with any suitable shared memory device within information handling system 300, such as a SMRAM 702. In certain examples, SMRAM 702 may be substantially similar to shared memory 404 of FIGS. 4-6. Shared memory map 700 may be performed during any boot phase of information handling system 300, such as PEI phase.

During the platform initialization phase in the PEI phase, main processor 302 and hybrid processor 304 of the chipset may be configured to establish SMIs for various events within information handling system 300. In an example, if heterogeneous compute support is enabled, a PEI phase SMI initialization memory reference code (MRC) module may be implemented to configure one or more SMIs for special events within information handling system 300. For example, the SMIs for special events may be any number of SMIs including, but not limited to, a SMI to communicate data from main processor 302 to hybrid processor 304 (MHC), and a SMI to communicate data from the hybrid processor to the main processor (HMC).

In an example, a custom MRC module of information handling system 300 may designate a region 710 of SMRAM 702 for communication SMIs. For example, shared memory map 700 may create an explicit memory map for SMI based communications that should be used as SMRAM 702 and may specify where each of main processor 302 and hybrid processor 304 may jump when a SMI for an established special event occurs.

During operation, the chipset of information handling system 300 may detect a configured special event and signal an associated SMI. In response to the SMI, main processor 302 or hybrid processor 304 may enter a SMM by jumping to an SMM entry point within region 710. In an example, shared memory map 700 may be utilized for communication between main processor 302 and hybrid processor 304. Additionally, a SMI special event may implement an event buffer to execute action commands for a target processor, such as main processor 302 or hybrid processor 304.

The pre-boot operations described above may create an improved information handling system 300, which may include two independent compute domains between main processor core 302 and hybrid processor core 304. In an example, the pre-boot operations may partition the hardware, such as main processor core 302, hybrid processor core 304, L3 cache 306, and DIMM devices 308 and 310, into dedicated and separate heterogeneous compute domains. In this example, the heterogeneous compute domains may enable an online service of information handling system 300 even when the host OS on main processor core 302 is down.

The heterogeneous compute domains may provide reliability, accessibility, and serviceability (RAS) within information handling system 300 to enable a true OOB functionality by loading a RTOS/EOS on hybrid processor core 304.

Additionally, the pre-boot operations improve information handling system 300 by creating a SMI interrupting mechanism to provide a true OOB communication capability between the host OS of main processor core 302 and the resilient OS or EOS of hybrid processor core 304. In an example, EOS on hybrid processor core 304 may enable an IT administrator to perform any suitable operations including, but not limited to, firmware updates, firmware downgrades, OS deployments, OS recoveries, SOS, and OS boot operations.

Figure 8:
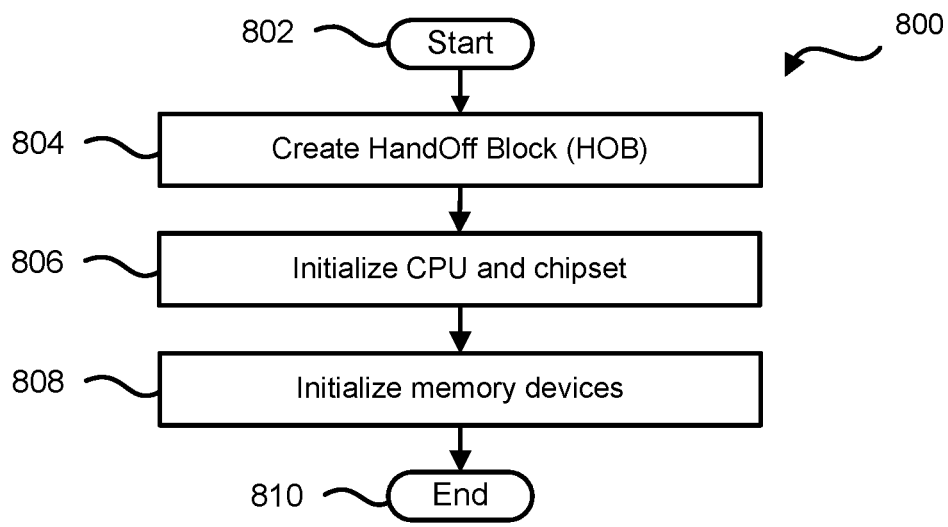
FIG. 8 is a flow diagram showing a method for initializing components in an information handling system during a first pre-boot phase according to at least one embodiment of the present disclosure.

FIG. 8 shows a method 800 for initializing components in an information handling system during a first pre-boot phase according to at least one embodiment of the present disclosure, starting at block 802. It will be readily appreciated that not every method step set forth in this flow diagram is always necessary, and that certain steps of the methods may be combined, performed simultaneously, in a different order, or perhaps omitted, without varying from the scope of the disclosure. FIG. 8 may be employed in whole, or in part, by BIOS 172 of FIG. 1, or any other type of controller, device, module, processor, or any combination thereof, operable to employ all, or portions of, the method of FIG. 8.

At block 804, a hand-off-block (HOB) is created. In an example, the HOB may be created during a PEI phase of pre-boot operations for an information handling system. The HOB may be created to handle the driver initialization in DXE phase. At block 806, a CPU and chipset are initialized. In an example, the CPU may include a main processor and a hybrid processor. The chipset may include the CPU and an L3 cache for the main and hybrid processors. At block 808, memory of the information handling system is initialized, and the flow ends at block 810. In an example, the memory initialization may include any suitable memory device or devices, such as DIMM devices of the information handling system.

Figure 9:
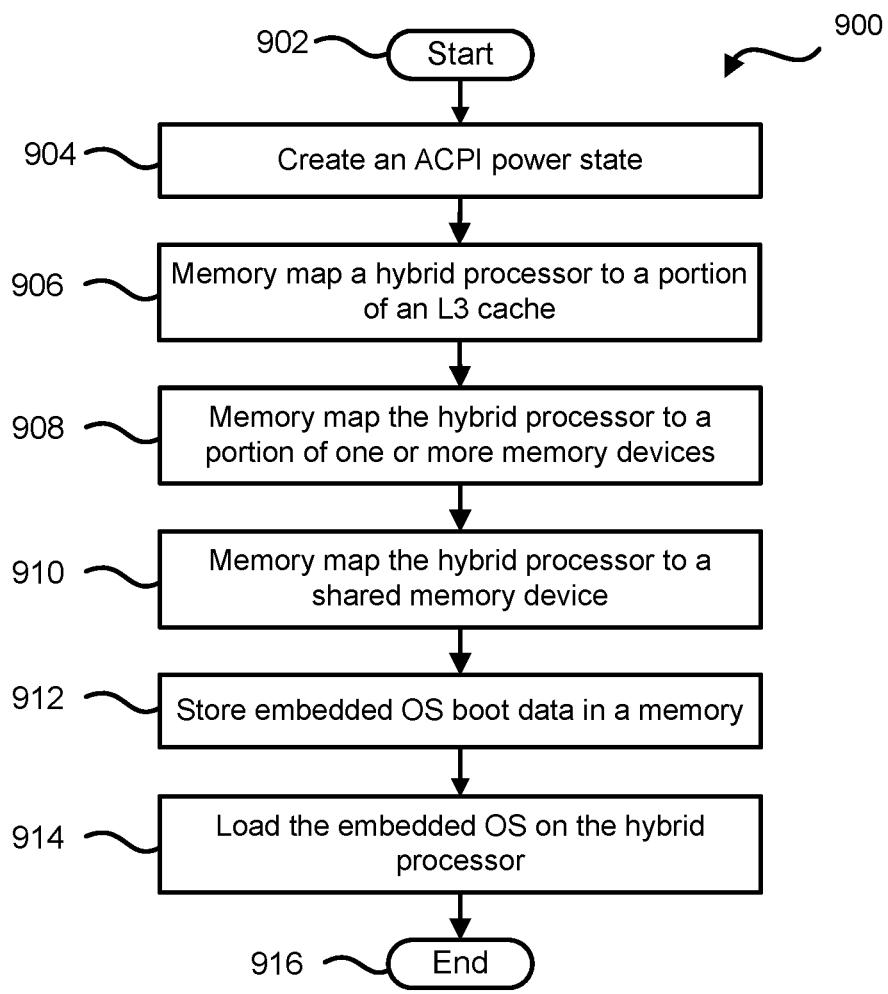
FIG. 9 is a flow diagram of a method for configuring a heterogeneousgeneous compute domain in an information handling system during a second pre-boot phase according to at least one embodiment of the present disclosure.

FIG. 9 shows a method 900 for configuring a heterogeneous compute domain in an information handling system during a second pre-boot phase according to at least one embodiment of the present disclosure, starting at block 902. It will be readily appreciated that not every method step set forth in this flow diagram is always necessary, and that certain steps of the methods may be combined, performed simultaneously, in a different order, or perhaps omitted, without varying from the scope of the disclosure. FIG. 9 may be employed in whole, or in part, by BIOS 172 of FIG. 1, or any other type of controller, device, module, processor, or any combination thereof, operable to employ all, or portions of, the method of FIG. 9. In an example, the operations of FIG. 9 may be performed during a pre-boot DXE phase.

At block 904, an ACPI power state is created. In an example, the ACPI power state may be associated with a host processor, such as a main processor, of information handling system. In an example, a chipset of the information handling system may include the main processor and a smaller hybrid processor. At block 906, the hybrid processor is memory mapped to a portion of an L3 cache in the chipset of the information handling system. In an example, the portion of the L3 cache may be a dedicated portion that is allocated only to the hybrid processor.

At block 908, the hybrid processor is memory mapped to a portion of one or more memory devices in the information handling system. The portion of the memory devices may be a dedicated small portion that is allocated only to the hybrid processor. In an example, the memory devices may be any suitable memory devices, such as DIMM devices. At block 910, the hybrid processor is memory mapped to a shared memory of the information handling system. The hybrid processor may be mapped to all of the shared memory. In an example, the shared memory may be a peripheral device such as USB, NIC, Serial, or the like. At block 912, an embedded operating system (EOS) is stored within a memory of the information handling system. The EOS may be associated with the hybrid processor of the information handling system.

At block 914, the EOS may be loaded on the hybrid processor, and the flow ends at block 916. In an example, memory mapping of partition in L3 cache as well as memory mappings to the memory devices, and the shared memory may enable the respective L3 cache, memory devices, and shared memory to be allocated to the hybrid processor at the firmware level during a DXE phase of the boot operations in the information handling system.

Figure 10:
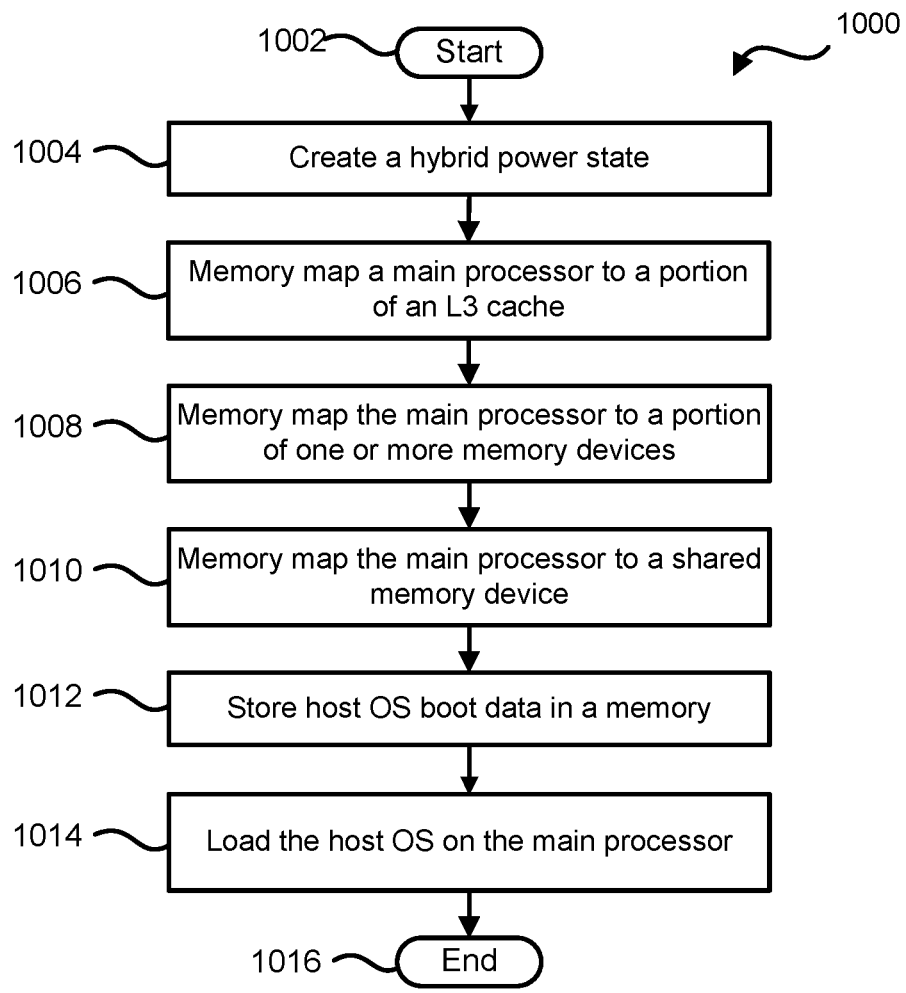
FIG. 10 is a flow of method for configuring the heterogeneousgeneous compute domain in an information handling system during a third pre-boot phase according to at least one embodiment of the present disclosure.

FIG. 10 shows a method 1000 for configuring the heterogeneous compute domain in an information handling system during a third pre-boot phase according to at least one embodiment of the present disclosure, starting at block 1002. It will be readily appreciated that not every method step set forth in this flow diagram is always necessary, and that certain steps of the methods may be combined, performed simultaneously, in a different order, or perhaps omitted, without varying from the scope of the disclosure. FIG. 10 may be employed in whole, or in part, by BIOS 172 of FIG. 1, or any other type of controller, device, module, processor, or any combination thereof, operable to employ all, or portions of, the method of FIG. 10. In an example, the operations of FIG. 9 may be performed during a pre-boot BDS phase.

At block 1004, a hybrid power state is created. In an example, the hybrid power state may be associated with a hybrid processor of information handling system. In an example, a chipset of the information handling system may include a main processor and a smaller hybrid processor. At block 1006, the main processor is memory mapped to a portion of an L3 cache in the chipset of the information handling system. In an example, the portion of the L3 cache may be a dedicated portion that is allocated only to the main processor.

At block 1008, the main processor is memory mapped to a portion of one or more memory devices in the information handling system. The portion of the memory devices may be a dedicated portion that is allocated only to the main processor. At block 1010, the main processor is memory mapped to a shared memory of the information handling system. The main processor may be mapped to all of the shared memory. At block 1012, a host operating system (OS) is stored within a memory of the information handling system. The host OS may be associated with the main processor of the information handling system.

At block 1014, the host OS may be loaded on the main processor and the flow ends at block 1016. In an example, memory mapping of partition in L3 cache as well as memory mappings to the memory devices, and the shared memory may enable the respective L3 cache, memory devices, and shared memory to be allocated to the main processor at the firmware level during a BDS phase of the boot operations in the information handling system.

Figure 11:
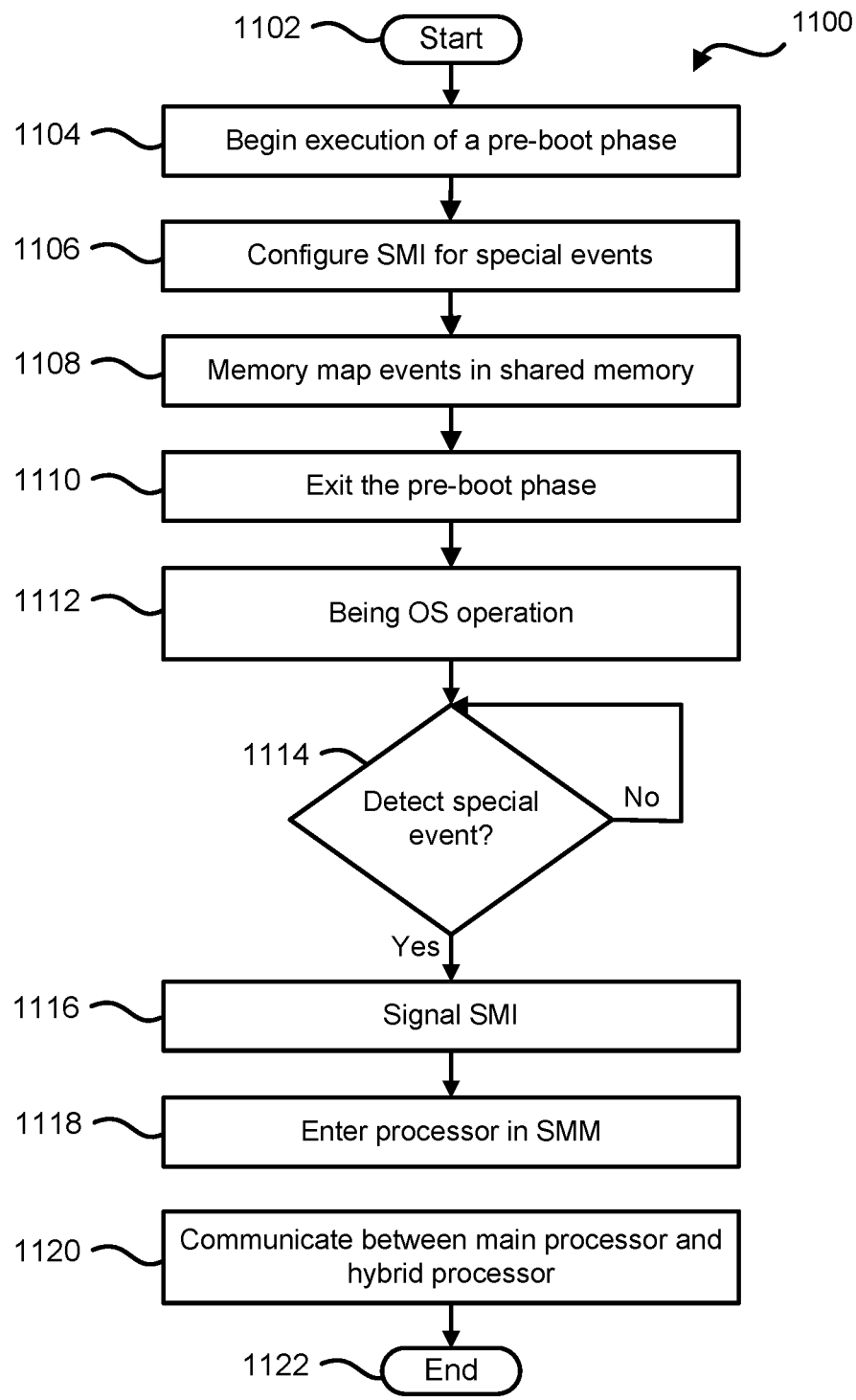
FIG. 11 is a flow of method for configuring special system management interrupt events for both a main processor and a hybrid processor in an information handling system according to at least one embodiment of the present disclosure.

FIG. 11 illustrates a method 1100 for configuring special system management interrupt events for both a main processor and a hybrid processor in an information handling system according to at least one embodiment of the present disclosure, starting at block 1102. It will be readily appreciated that not every method step set forth in this flow diagram is always necessary, and that certain steps of the methods may be combined, performed simultaneously, in a different order, or perhaps omitted, without varying from the scope of the disclosure. FIG. 11 may be employed in whole, or in part, by BIOS 172 of FIG. 1, or any other type of controller, device, module, processor, or any combination thereof, operable to employ all, or portions of, the method of FIG. 11.

At block 1104, a pre-boot phase of an information handling system is started. In an example, the pre-boot phase may be a PEI phase. At block 1106, SMIs are configured for special events within an information handling system. In certain examples, the SMIs for the special events may be configured by any suitable device, such as a memory reference code (MRC) module of the information handling system. At block 1108, the special events are memory mapped to a shared memory. In an example, the shared memory may be any suitable type of memory including, but not limited to, a SMRAM. The special events may be communications between a main processor and a hybrid processor of the information handling system. At block 1110, the pre-boot phase is exited.

At block 1112, OS operation is begun. In an example, the OS operation may include two independent OS runtime stacks, such as a host OS runtime stack and a hybrid EOS runtime stack. At block 1114, a determination is made whether a special event has been detected. The special event may be a communication between the main processor and the hybrid processor to transfer tasks between the processors.

In response to the special event being detected, a SMI is signaled at block 1116. The SMI may be associated with a dedicated SMI for an inter-processor communication hub (IPC). At block 1118, one or both of the processors enter into a system management mode (SMM). At block 1120, data is communicated between the main processor and the hybrid processor, and the flow ends at block 1122. In certain examples, the SMI may be either for a task to be transferred from the main processor to the hybrid processor, or to be transferred from the hybrid processor to the main processor.

If the SMI is a special MEW interrupt to delegate tasks from the main processor to the hybrid processor, the SMI may enable the hybrid processor to read a message in the shared memory. In an example, an SMI interrupt handler running on the hybrid processor may execute the MEW interrupt. For example, the SMI interrupt handler may enable communication channels from the main processor to the hybrid processor so that the SMI interrupt handler may read the data from the shared memory.

If the SMI is a special HMC interrupt to delegate tasks from the hybrid processor to the main processor, the SMI may enable the main processor to read a message in the shared memory. In an example, an SMI interrupt handler running on the main processor may execute the HMC interrupt. For example, the SMI interrupt handler may enable communication channels from the hybrid processor to the main processor so that the SMI interrupt handler may read the data from the shared memory.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
    a memory device;
    a memory;
    a chipset to communicate with the memory device, the chipset including a main processor and a hybrid processor; and
    a basic input/output system (BIOS), during a first pre-boot phase, the BIOS to:
        memory map the hybrid processor to a first portion of the memory device; and
        store an embedded operating system in the memory; and
    during a second pre-boot phase, the BIOS to:
        memory map the main processor to a second portion of the memory device, wherein the second portion is a larger portion of the memory device than the first portion;
        store a host operating system in the memory; and
        load the embedded operating system on the hybrid processor.

2. The information handling system of claim 1, wherein during the second pre-boot phase, the BIOS further to create an advanced configuration and power interface power state for the main processor, wherein the hybrid power state is a low power state as compared to the advanced configuration and power interface power state.

3. The information handling system of claim 2, wherein during a third pre-boot phase, the BIOS further to:
    load the host operating system on the main processor; and
    create a hybrid power state for the hybrid processor, wherein the hybrid power state is a low power state as compared to the advanced configuration and power interface power state.

4. The information handling system of claim 3, wherein the third pre-boot phase is a boot device selection phase.

5. The information handling system of claim 3, wherein the chipset further includes a cache, wherein during the second pre-boot phase, the BIOS to memory map a first portion of the cache to the hybrid processor, and during the third pre-boot phase, the BIOS to memory map a second portion of the cache to the main processor.

6. The information handling system of claim 1, wherein the first pre-boot phase is a pre-EFI initialization.

7. The information handling system of claim 1, wherein the second pre-boot phase is a driver execution environment phase.

8. The information handling system of claim 1, wherein the memory device is a dual in-line memory module device.

9. A method comprising:
    during a first pre-boot phase:
        memory mapping a hybrid processor of an information handling system to a first portion of a memory device of the information handling system; and
        storing an embedded operating system in a memory of the information handling system; and
    during a second pre-boot phase:
        memory mapping a main processor of the information handling system to a second portion of the memory device, wherein the second portion is a larger portion of the memory device than the first portion;
        storing a host operating system in the memory; and
        loading the embedded operating system on the hybrid processor.

10. The method of claim 9, wherein during the second pre-boot phase, the method further comprises creating an advanced configuration and power interface power state for the main processor, wherein the hybrid power state is a low power state as compared to the advanced configuration and power interface power state.

11. The method of claim 10, wherein during a third pre-boot phase, the method further comprises:
   loading the host operating system on the main processor; and
   creating a hybrid power state for the hybrid processor, wherein the hybrid power state is a low power state as compared to the advanced configuration and power interface power state.

12. The method of claim 11, wherein the third pre-boot phase is a boot device selection phase.

13. The method of claim 11, wherein the method further comprises:
   during the second pre-boot phase:
      memory mapping a first portion of a cache of the information handling system to the hybrid processor; and
   during the third pre-boot phase:
      memory mapping a second portion of the cache to the main processor.

14. The method of claim 9, wherein the first pre-boot phase is a pre-EFI initialization.

15. The method of claim 9, wherein the second pre-boot phase is a driver execution environment phase.

16. The method of claim 9, wherein the memory device is a dual in-line memory module device.

\* \* \* \* \*